United States Patent [19]

Aksman

[11] Patent Number: 4,683,269
[45] Date of Patent: Jul. 28, 1987

[54] OPAQUE BINDER SYSTEM

[75] Inventor: Igor B. Aksman, Dover, Del.

[73] Assignee: Reichhold Chemicals, Inc., White Plains, N.Y.

[21] Appl. No.: 810,422

[22] Filed: Dec. 18, 1985

[51] Int. Cl.⁴ .............................................. C08L 51/00
[52] U.S. Cl. ...................................... 525/258; 525/78; 525/80; 525/261; 525/301; 525/303; 525/193; 525/902
[58] Field of Search ............... 525/193, 902, 261, 258, 525/301, 303; 524/201, 206

[56] References Cited

U.S. PATENT DOCUMENTS

| | | | |
|---|---|---|---|
| 4,069,186 | 1/1978 | Ramig | 524/497 |
| 4,391,928 | 7/1983 | Herman et al. | 525/902 |
| 4,427,836 | 1/1984 | Kowalski et al. | 525/902 |
| 4,469,825 | 9/1984 | Kowalski et al. | 525/902 |

Primary Examiner—Allan M. Lieberman
Attorney, Agent, or Firm—Rodman and Rodman

[57] ABSTRACT

The present invention relates to an opaque binder system containing a core-shell polymer and polymeric binder. The system is prepared and blended in-situ and demonstrates improvement in contrast ratio and scrub properties over corresponding compositions wherein the core-shell polymer is separately produced and subsequently blended with a binder polymer.

15 Claims, No Drawings

OPAQUE BINDER SYSTEM

BACKGROUND OF THE INVENTION

1. Field of the Invention

The present invention relates to a polymeric binder that is capable of producing opaque films with excellent properties when formulated into a latex coating composition.

2. Description of the Prior Art

Latex paint compositions generally include a pigment or contain air voids to provide opacity, and also include a film forming polymeric binder to protect and coat an underlying substrate.

Various inorganic pigment particles such as titanium dioxide, barium sulfate, calcium carbonate and carbon black, have been conventionally utilized in paper making and paint compositions. The inorganic pigment particles are generally on the order of about 0.1 to 1 micron. The opacifying effect from the pigment particles is derived from a high light scattering coefficient which is a consequence of the particle size and a high index of refraction.

Opacification has also been achieved by entrapping air in the film forming polymeric binder to provide voids in the paint film. This contributes to scattering of light and assists the latex film to achieve the required opacity.

U.S. Pat. No. 4,391,928 to Herman et al, discloses capsular opacifier systems useful in latex paint compositions. These systems have a solid hard core and a solid soft shell which can replace both inorganic pigments and film-forming agents in a paint composition. The polymeric core material capable of being encapsulated should have a glass transition temperature, $T_g$ greater than about 80° C., and the shell materials should have a $T_g$ less than about 45° C. The capsular opaque system is physically blended with a binder and incorporated into an aqueous latex dispersion paint composition.

U.S. Pat. No. 3,839,064 to Vincent, discloses titanium dioxide loaded microcapsular opacifier pigment products having a solid polymeric core and a solid polymeric shell. The core contains an inorganic pigment, such as titanium dioxide dispersed therein. The materials used to make the encapsulating shell are ethylenically unsaturated monomers.

U.S. Pat. No. 4,069,186 to Ramig, discloses opacified latex paints having a majority of polymer particles larger than 1000 A° in diameter, and solid non film-forming polymer particles with an average diameter between about 1000–10,000 A°.

Also of interest are U.S. Pat. Nos. 3,423,351 to Pierce et al; 3,779,800; 3,853,579 and 3,949,138; each to Heiser; 4,226,752 to Erickson et al; 4,497,917 to Upson et al; 4,385,152 to Boyack et al; 4,267,094 to Huhn et al; 3,657,172 to Gallagher et al and 4,419,465 to Backhouse et al.

SUMMARY OF THE INVENTION

The present invention relates to an opaque binder system containing a core-shell polymer and polymeric binder. The system is prepared and blended in-situ and demonstrates improvement in contrast ratio and scrub properties over corresponding compositions wherein the core-shell polymer is separately produced, and subsequently blended with a binder polymer.

DESCRIPTION OF THE PREFERRED EMBODIMENTS

In accordance with the present invention, an opaque polymeric binder system is produced which comprises a mixture of homogeneous film-forming polymeric particles and heterogeneous core-shell polymeric particles. The mixture is formed in situ in a single polymerization process. An advantage of the present invention is that it enables the paint formulator to reduce the inorganic pigment content in a latex paint composition without adversely affecting the film performance, and thereby significantly reduce the cost of the paint.

The homogeneous film-forming particles are produced from a suitable polymeric material having a "glass transition temperature" ($T_g$) less than about 45° C. The glass transition temperature is defined as the temperature at which the polymer passes from the glassy state to the rubbery state, or vice versa. Preferred polymeric materials for the film-forming particles include polymers and/or copolymers derived from methyl acrylate, butyl acrylate, ethyl hexyl acrylate, hydroxy ethyl methacrylate, methacrylic acid, acrylic acid, styrene, vinyl acetate and mixtures thereof used in such proportions to give a $T_g$ less than about 45° C.

The particles which comprise the hard nonfilm-forming core have a $T_g$ that is greater than about 80° C. The polymeric core is made without any inorganic pigment. Suitable monomeric materials include amine-free ethylenically unsaturated monomers, such as acrylic esters, for example, methyl methacrylate, butyl methacrylate, isopropyl methacrylate, as well as other vinyl polymers such as vinylidene chloride, styrene, divinyl benzene, acrylonitrile, vinyl chloride, alone or mixtures thereof. Preferred polymeric core materials are polystyrene, polyvinyl chloride, and polymethyl methacrylate. The core can also be formed of a crosslinked polymeric material having a $T_g$ greater than about 70° C. A particularly preferred core material is polystyrene due to the ease of manufacture of monodisperse particles and low cost.

The hard nonfilm-forming polymeric core particles have an average particle size of about 0.1 to 1.0 microns, preferably 0.2 to 0.5 microns, and are made in a separate step using any suitable emulsion polymerization technique, such as that described in Woods et al J. Paint Technology 40, 541 (1968).

The polymeric shell material used to encapsulate the core particles is generally the same polymeric material used to obtain the homogeneous film-forming particles. The ratio of polymeric material used to produce the homogeneous film-forming particles and to encapsulate the core material, to that of the polymeric material used to produce the core particles varies from about 1:9–9:1, with 1:2–2:1 being preferred.

The techniques of emulsion polymerization used to obtain mixtures of the homogeneous polymeric particles and the heterogeneous core-shell polymeric particles employ conventional initiator systems such as sodium, potassium, and ammonium persulfates, peroxides and reduction/oxidation catalyst systems. It has also been found that a mixture of nonionic and anionic surfactants blended in weight ratios of about 2:1 to about 20:1, with about 5:1 to about 10:1 being preferred, is essential in controlling the latex core/shell structure and stability, as described by J. R. Erickson et al, "Latex Seed Particle Growth at High Surfactant Surface Coverage", Emulsion Polymers and Emulsion Polymerization, ACS Symposium Series 165, Edited by E. R. Bassett and A. E. Hamielec, pages 483–504 (American Chemical Society 1981).

The total amount of anionic surfactant should not be in excess of the amount required to saturate the surface of the polymer seed. An excess will tend to form new micelles from which new particles can grow. An insufficient concentration of surfactant will result in poor stability of the final polymerization latex.

Anionic surfactants useful in the polymerization include sulfates and sulfonates. Nonionic surfactants that are useful include polyethylene ether derivatives of alkyl aryl phenols.

The production of the opaque binder system begins with the emulsion polymerization of about 5–95%, preferably 25–50% by weight of the monomeric materials suitable for producing a homogeneous film-forming polymeric material having a $T_g$ of less than about 45° C. These include amine-free polymers and/or copolymers derived from methyl acrylate, butyl acrylate, ethyl hexyl acrylate, hydroxy ethyl methacrylate, methacrylic acid, acrylic acid, styrene, vinyl acetate and mixtures thereof. Thus, a predetermined amount of the aforesaid monomeric material is charged or continuously added into a reactor containing aqueous phase ingredients which include the necessary amount of surfactants and catalysts. Correspondingly, the surfactant and catalyst can also be charged entirely into the reactor at one time, or metered continuously over a period of time, and is a matter of choice and convenience in performing the process. The amount of monomers polymerized during this stage is about 5–95%, preferably 25–50% by weight of the total amount of monomers in the final latex.

When the required degree of polymerization is reached, the polymerization is continued in the presence of the hard nonfilm-forming polymeric core particles having a $T_g$ greater than 80° C. The polymeric core particles which have been previously formed are gradually added to the polymerization reaction along with the remaining quantity of monomers used to produce the homogeneous polymeric particles.

The continuation of the polymerization results in the simultaneous encapsulation of the core particles by the homogeneous polymer, as well as the continued production of the homogeneous film-forming polymeric material.

The resulting polymeric latex comprises the in situ admixture of the core-shell polymer and film forming polymer which constitute the opaque polymeric binder system. The binder system can have a solid content varying from about 40–70% by weight, preferably 50–60%. The amount of hard core particles can vary from about 10–90% of the final latex solid content, with about 20–50% being preferred.

The polymeric latex when applied to a substrate produces a flexible opaque continuous film upon drying at room temperature. The latex can be used in conventional paint formulations without the addition of other polymeric binders. This enables the formulator to significantly reduce the consumption of expensive inorganic pigments in the paint formula or coating composition, while maintaining excellent film opacity and scrub performance properties. The inventive opaque polymeric binder system substantially reduces the economics of paint production without compromising desired properties.

In the following examples, which serve to illustrate the present invention, all parts and percentages are by weight unless otherwise indicated.

EXAMPLE 1—Preparation of Hard Polymeric Core 1065 grams of distilled water, 22 grams of DOWFAX 2A1*, 9 grams of Sodium Polystep A-15**, 98.5 grams of polystyrene seed latex having a solid content of 40% and an average particle size of 0.05 microns, 0.5 grams of acrylic acid, and 499.5 grams of styrene were added into a reactor and deaerated. The resulting emulsion was heated to 70° C. and 0.5 grams of sodium persulphate was added. The mixture was stirred for 5 hours to form milky white latex. The final latex was vacuum stripped to remove residual styrene and filtered through a 200 mesh screen. The resulting product contained 47% solids, and the latex particles had an average diameter of 0.2 microns.

\* Dodecyl Diphenyloxide Disulfonate (Dow Chemical Co.)
\*\* Sodium Alkyl Benzene Sulfonate (Stepan Chemicals Company)

EXAMPLE 2—Opaque Binder 336 grams of distilled water, 19.8 grams of Triton X-405*, 3.3 grams of Alipal CO-436**, and 0.6 grams of sodium bicarbonate were added to a 2 liter flask equipped with condenser and agitator. The solution was deaerated and heated to 75° C. and 1.2 grams of sodium persulfate was added. A monomer solution of 420 grams of vinyl acetate and 180 grams of butyl acrylate was deaerated and continuously added into the flask over a 4 hour period. After 25% of the total monomer solution was added, a mixture of 512 grams of the product from Example 1, 9 grams of Triton X-405 nonionic surfactant, 1.5 grams of Alipal CO-436 and 65 grams of distilled water was deaerated and continuously added into the flask over a period of 1½ hours, along with the remaining monomer solution in a separate stream. When all the ingredients had been added, the mixture was reacted for ½ hour at 79° C., then cooled and filtered through a 200 mesh screen. The resulting latex contained 55% solids and had a viscosity of 1200 centipoise as determined by a Brookfield viscometer.

\* Ethoxylated octyl phenol (Rohm and Haas Co.)
\*\* Ammonium salt of sulfated nonylphenoxypoly (ethyleneoxy) ethanol (GAF Corporation)

EXAMPLE 3

The final product from Example 2 was formulated into an interior flat paint composition at 50% and 70% Pigment Volume Concentration (PVC). The paint performance was evaluated versus control paints prepared with a vinyl acrylic binder Wallpol 40-136 (Reichhold Chemicals, Inc.). The results are summarized in Table I which follows:

TABLE 1

|  | 50% PVC | | 70% PVC | |
| --- | --- | --- | --- | --- |
|  | CONTROL | OPAQUE BINDER | CONTROL | OPAQUE BINDER |
| COMPONENTS |  |  |  |  |
| TiO$_2$ (grams) | 150.0 | 125.0 | 150.0 | 125.0 |
| Pigment Slurry (grams) | 782.3 | 782.3 | 994.3 | 994.3 |
| Binder (grams) | 293.0 | — | 163.0 | — |

TABLE 1-continued

|  | 50% PVC | | 70% PVC | |
| --- | --- | --- | --- | --- |
|  | CONTROL | OPAQUE BINDER | CONTROL | OPAQUE BINDER |
| (55% solids) | | | | |
| Opaque Binder | — | 293.0 | — | 163.0 |
| Water (grams) | 75.0 | 75.0 | 50.0 | 50.0 |
| PROPERTIES | | | | |
| Contrast Ratio (C.R.) | 0.957 | 0.962 | 0.976 | 0.976 |
| Reflectance | 0.93 | 0.96 | 0.918 | 0.917 |
| Gilsonite Stain | | | | |
| (% loss) | 5.6 | 14.5 | 26.0 | 29.0 |
| Scrub | | | | |
| (% Film Removal) | 55–60 (1200 cycles) | 55–60 (1200 cycles) | 60–65 (175 cycles) | 50–55 (175 cycles) |
| Enamel Holdout (% sealing efficiency) | 96 | 87 | 36 | 34 |

The opaque binder of the present invention demonstrates good contrast ratio and scrub performance properties in both the 50% PVC and 70% PVC formulations, with reduced amounts of $TiO_2$, in comparison to the control formulations. Notably, in the 50% PVC formulations, the inventive composition was an improvement over the control in contrast ratio, and in the 70% PVC formulations, the inventive composition was an improvement over the control in % film removal.

EXAMPLE 4

312.6 grams of distilled water, 19.8 grams of Polystep F-9*, and 4.5 grams of Polystep B-1** were added to a 2-liter flask equipped with condenser and agitator. The solution was deaerated and heated to 75° C., and 0.6 grams of sodium persulfate was added. A monomer solution of 420 grams of vinyl acetate, 177 grams of butyl acrylate, and 3 grams of acrylic acid was continuously added over a four hour period. Solutions of 1.38 grams of sodium persulfate and 0.6 grams of sodium bicarbonate in 30 grams of distilled water and 0.48 grams of sodium formaldehyde sulfoxylate in 30 grams of water were added in two separate streams over 4.5 hours. After 25% of the total monomer solution was added, a mixture of 646.8 grams of the product from Example 1, 24 grams of Polystep F-9, 6 grams of Polystep B-1, and 30 grams of distilled water was deaerated and continuously added into the flask over a period of 1.5 hours, along with the remaining monomer solution, initiator, and catalyst in separate streams. When all the ingredients had been added, the mixture was reacted for 0.5 hour at 75° C., cooled and filtered through 200-mesh screen. The resulting "opaque binder" latex contained 53% solids and had a viscosity of 625 centipoise as determined by a Brookfield viscometer. The "opaque binder" latex included 33% of the total polymer composition as a hard nonfilm-forming polystyrene polymer. The film of the latex when drawn on the surface and dried is flexible and opaque.

* Ethoxylated nonyl phenol (Stepan Chemical Co.)
** Ethoxylated alkyl sulfate, ammonium salt (Stepan Chemical Co.)

EXAMPLE 5

1,266 grams of the latex from Example 1, 36.8 grams of Polystep F-9, 9.2 grams of Polystep B-1, and 29.4 grams of distilled water were placed into a 2-liter flask equipped with condenser and agitator. The solution was deaerated, heated to 75° F., and 0.4 grams of sodium persulfate was added. A monomer mixture of 280 grams of vinyl acetate, 118 grams of butyl acrylate, and 2 grams of acrylic acid was metered in the flask over four hours. Solutions of 0.92 grams of sodium persulfate, 0.4 grams of sodium bicarbonate in 20 grams of distilled water and 0.32 grams of sodium formaldehyde sulfoxylate in 20 grams of distilled water were continuously added in two separate streams over a 4.5 hour period. When all the feeds had been added, the mixture was reacted for 0.5 hour at 75° C., cooled and filtered through 200-mesh screen. The resulting core/shell latex contained 52% solids. The amount of vinyl/acrylic shell around the polystyrene core was 40% of the total polymer particle.

EXAMPLE 5

441 grams of distilled water, 26.4 grams of Polystep F-9, and 6.6 grams of Polystep B-1 were added to a 2-liter flask equipped with condenser and agitator. The solution was deaerated, heated to 75° C., and 0.6 grams of sodium persulfate was added. A monomer solution of 420 grams of vinyl acetate, 177 grams of butyl acrylate, and 3 grams of acrylic acid was metered in the flask over a four hour period. Solutions of 1.38 grams of sodium persulfate, 0.6 grams of sodium bicarbonate in 30 grams of distilled water were continuously added in two separate streams over a period of 4.5 hours. When all the ingredients had been added, the mixture was reacted for an additional 0.5 hour, cooled, and filtered through 200-mesh screen. The resulting latex contained 55% solids and formed clear and flexible film when drawn and dried on the surface.

EXAMPLE 7

400 grams of the core/shell latex from Example 5 were blended with 324 grams of the product from Example 6 to form a blend with 33% of the total polymer composition being a hard nonfilm-forming polystyrene core. The blend having 52.6% solids was formulated into 50% PVC interior flat paint composition and compared with similar paint on the basis of the "opaque binder" from Example 4. The results are summarized in Table 2 which follows:

TABLE 2

|  | 50% PVC | |
| --- | --- | --- |
|  | OPAQUE BINDER | BLEND |
| COMPONENTS | | |
| Pigment slurry | 782.3 | 782.3 |
| Opaque Binder | 304.0 | — |
| Blend | — | 306.4 |
| Water | 64.0 | 61.6 |
| PROPERTIES | | |
| Contrast ratio (C.R.) | 0.964 | 0.964 |

TABLE 2-continued

| | 50% PVC | |
| --- | --- | --- |
| | OPAQUE BINDER | BLEND |
| Reflectance | 0.913 | 0.914 |
| K & N Stain (% loss) | 21 | 21 |
| Enamel holdout (% sealing efficiency) | | |
| at 76° F. | 75 | 63 |
| at 41° F. | 69 | 48 |
| Scrub (% film removal after 1,000 cycles) | 45–50 | 75–80 |

The opaque binder based paint demonstrates improvement in scrub performance and film integrity (Enamel holdout).

What is claimed is:

1. A method for preparing an opaque polymeric binder system consisting essentially of:
   (a) emulsion polymerizing about 5 to 95% by weight of at least one monomer not having an amine moiety, selected from the group consisting of vinyl, acrylic, methacrylic, and mixtures thereof, to produce homogeneous film forming polymeric particles having a $T_g$ of less than about 45° C.;
   (b) continuing the polymerization of step (a) in the presence of non-film forming hard, solid polymeric core particles having an average size of about 0.1 to 1 microns and a $T_g$ greater than about 70° C., said polymeric core particles being previously formed from at least one monomer not having an amine moiety, different from, (a) selected from ethylenically unsaturated compounds, and gradually added to the polymerization of the homogenous film forming particles, in the presence of a mixture of nonionic and anionic surfactants having weight ratios of about 2:1 to 20:1 respectivley, wherein a portion of the homogeneous film forming material produced forms an encapsulating shell surrounding the core particles to produce a mixture of heterogeneous core-shell particles and said homogeneous film forming polymeric particles, and wherein the ratio of homogeneous film forming polymeric material to the polymeric material used to produce the core particles varies from about 1:9–9:1, respectively.

2. The method of claim 1(a) wherein the monomers are selected from the group consisting of: methyl acrylate, butyl acrylate, ethyl hexyl acrylate, hydroxy ethyl methacrylate, methacrylic acid, acrylic acid, styrene, vinyl acetate and mixtures thereof.

3. The method of claim 1, wherein the polymer core particles are formed from monomers selected from the group consisting of: methyl methacrylate, butyl methacrylate, isopropyl methacrylate, vinylidene chloride, styrene, divinyl benzene, acrylonitrile, vinyl chloride, and mixtures thereof.

4. The method of claim 3, wherein the polymer core particles are formed from styrene.

5. The method of claim 1, wherein the ratio varies from about 1:2 to about 2:1.

6. The method of claim 1 wherein the binder system has a solids content of about 40 to 70% weight.

7. The method of claim 6, wherein the solids content varies from about 50 to 60% weight.

8. The method of claim 1, wherein the amount of core particles varies from about 10 to 90% by weight of the binder system.

9. The method of claim 8, wherein the core particles vary from about 20 to 50% by weight.

10. The method of claim 1, wherein the anionic surfactants are selected from the group consisting of sulfates and sulfonates.

11. The method of claim 1, wherein the nonionic surfactants are polyethylene ether derivatives of alkyl aryl phenols.

12. The method of claim 1, step (a), wherein the emulsion polymerizing varies from about 25 to 50% by weight.

13. The product formed by the method of claim 1.

14. The product formed by the method of claim 5.

15. The product formed by the method of claim 12.

* * * * *